3,626,742
COLORIMETRIC OXYGEN DETECTOR
John P. Hogan and Donald R. Witt, Bartlesville, Okla.,
assignors to Phillips Petroleum Company
No Drawing. Filed July 24, 1969, Ser. No. 844,615
Int. Cl. C07d 103/00, 105/00; G01n 31/22
U.S. Cl. 23—232 R           7 Claims

ABSTRACT OF THE DISCLOSURE

A process for detecting the presence of free oxygen and oxides of sulfur and nitrogen in a gaseous stream which comprises contacting the reaction product of the reduction of an organo-transition metal compound with a metal hydride or an alkyl, the reduction compound containing the transition metal in a lower valence state, with the oxygen-containing gas to produce a color change in the reaction product.

---

This invention relates to colorimetric detectors.

In one of its more specific aspects, this invention relates to a material which undergoes a color change to indicate the presence of an extraneous gaseous material.

The use of materials which undergo a color change to indicate the presence of an extraneous gas is well known. The present invention provides a material which, besides being valuable as a detector and/or a scavenger, can be employed to determine the quantity of an extraneous gas with which it is contacted.

According to the method of this invention, there is provided a process for detecting the presence of free $O_2$ and oxides of sulfur and nitrogen in a gaseous stream which comprises contacting said stream with a composition comprising a product formed by the reduction of an organo-transition metal compound with a metal hydride or alkyl to produce an indicator comprising the transition metal in a lower valence state, which undergoes color change upon exposure to minute quantities of the oxygen-containing gas.

More specifically, this detector comprises an organo-transition metal compound comprising a composition formed by reducing an organic compound of a metal of Group IV–B, V–B, VI–B, VII–B, or VIII of the Periodic Table [Handbook of Chemistry and Physics, Chemical Rubber Company, 45th edition (1964), page B–2] with a hydride or alkyl of a metal of Group I–A, II or III–A of the Periodic Table, ibid., to a lower valence state in which form the composition undergoes a color change when contacted with an oxygen-containing gas.

The method of this invention contemplates the determination of free oxygen and of gaseous compounds of oxygen, particularly the oxides of sulfur, such as $SO_2$ and $SO_3$ and the oxides of nitrogen, such as $N_2O$, $NO$ and $NO_2$.

In one embodiment of this invention, the composition is employed without separation from the environment in which it is formed and in which environment it acts as a qualitative detection medium and/or scavenger.

In another embodiment of this invention, the composition is separated from the environment in which it is formed and deposited on a suitable support, in which form it acts as a quantitative detection medium and/or scavenger Accordingly, it is an object of this invention to provide easily prepared materials suitable for removal of minute traces of oxygen and oxygen-containing compounds from gaseous streams.

It is another object of this invention to provide agents for the quantitative measurement of oxygen and certain oxygen-containing compounds contained in gaseous streams in minute quantities which agents are employable in more than one form.

The organo-transition metal compounds employed in this invention are the organometallic compounds of the metals of Groups IV–B, V–B, VI–B, VII–B, or VIII, such as those recited in the Handbook of Chemistry and Physics, Chemical Rubber Co., 48th edition (1967–1968), pp. C–650 through C–685. Preferred metals include titanium, zirconium, tantalum, vanadium, chromium, manganese, iron, cobalt, and nickel. Preferred compounds are the acetylacetonates, cyclopentadienyl compounds, and the like.

The organo-transition metal compounds are reduced to a lower valence state by contacting with a hydride or alkyl of a metal of Group I–A, II, or III–A of the Periodic Table, ibid. Metal hydrides or alkyls having up to 4 carbon atoms such as lithium hydride, calcium hydride, diethyl zinc, triethylaluminum, and n-butyllithium are suitable. A preferred material is triethylaluminum.

The reduction of the organo-transition metal compounds is accomplished by bringing the reducing agent into contact with the organo-transition metal compounds in an inert medium for a period of from about 1 minute to about 1 hour at a temperature of from about 35° F. to about 200° F. The mol ratio of reductant to organo-transition metal compound is in the range of from about 0.5:1 to about 5:1. Any suitable hydrocarbon can be employed as the reaction medium, preferred hydrocarbons being n-pentane, n-hexane, benzene, toluene, and the like. The concentration of organo-transition metal compound in the reaction medium is in the range of 0.1 to 5 weight percent. Saturation is frequently the upper limit of the concentration, inasmuch as the solution is frequently saturated at concentrations below 5 weight percent.

Without further processing the solution of reduced organo-transition metal compound can be used for the qualitative indication of extraneous oxygen in gaseous streams by simply contacting the solution with oxygen-containing gas stream and noting the change in color imparted to the solution. Any practical rate of introducing the gaseous stream into the solution is satisfactory. For example, bubbling the gaseous stream through the solution at linear rates of from about 0.1 to about 10 feet per second effects adequate contacting. The presence of oxygen in the gaseous stream will be indicated by a change in color of the solution.

For quantitative determinations of oxygen and its gaseous compounds with nitrogen or sulfur in gaseous streams, the reaction composition is advantageously deposited on a support. Any support material such as silica, silica alumina, zirconia can be employed. It is preferable that the support be employed in particulate form and in a predried condition. The predrying consists of conventional calcination at temperatures of about 900–1500° F. for 0.1 to 20 hours.

Impregnation of the particulate support can be done by contacting the support with the solution of the reduced organo-transition metal compound in the absence of moisture and air, in any manner to deposit the reduced organo-transition metal compound on the support in a concentration of metal in the range of from about 0.01 to about 10 weight percent of the combined weight of the support and reaction product. Alternatively, the organo-transition metal compound can be applied to the support and the supported material then treated with the reductant. The hydrocarbon medium is then vaporized from the support by heating in the presence of an inert gas such as nitrogen. The impregnated support is then suitable for employment by bringing the gaseous stream into contact with the impregnated particulate support at reasonable gas rates, preferably at linear velocities of from about 0.1 to about 10 feet per second.

The following examples indicate the method of this invention as employed in both the qualitative and quantitative determination of extraneous oxygen in a gaseous stream.

EXAMPLE I

About 1 part by weight of chromium acetylacetonate was slurried in about 132 parts by weight of n-hexane. To the slurry were added 1.4 parts by weight of triethylaluminum. After agitation at room temperature, there had been formed a dark amber solution.

Without removing the reaction product from the n-hexane, a nitrogen stream containing about 9 parts per million oxygen was bubbled through a portion of the solution at a linear velocity of about five feet per second. The solution immediately began to change in appearance from dark amber to buff, thus indicating qualitatively the presence of oxygen in the gaseous stream and removing the oxygen from the nitrogen stream.

EXAMPLE II

A quantity of about 6 grams of particulate silica support, predried at 1000° F. in air, was introduced into about 45 grams of the dark amber solution of Example I and, after agitation to insure impregnation, the silica support was separated from the liquid and heated to dryness at about 160° F. in the absence of moisture and air while being flushed with nitrogen.

A portion of the amber-colored silica was placed in a small tube and a gaseous nitrogen stream containing about 9 p.p.m. oxygen was passed in contact with the silica at a linear velocity of about 0.725 foot per second. Immediately, the silica began to undergo a color change and after passage of about 0.2 s.c.f. of the gas, there existed a sharp color contrast forming a line of demarcation within the particulate matter, this color change having affected a quantity of material for a distance about 6 mm. down the tube. Accordingly, the material indicates the presence of oxygen, quantitatively, by means of an interface color change which advances through material at a rate of about 3.3 mm. per part per million of oxygen per standard cubic foot of gas throughput.

EXAMPLE III

Saturated pentane solutions of several other transition metal acetylacetonates were mixed with a sufficient amount of a pentane solution containing 0.112 g. of triethylaluminum to give a 4:1 mol ratio of triethylaluminum to metal compound. Portions of the same silica used in Example II, predried 4 hours at 1000° F. and prewetted with pentane, were impregnated with these solutions to give the metal contents and colors shown in the tabulation below. After drying, these materials were used to detect oxygen in an air/nitrogen blend containing 21 p.p.m. oxygen, which was passed over the material at linear velocity of about 0.5 foot per second. The indicated color change, and rate of travel of the color change interface are shown in the tabulation.

| Acetylacetonate used | Metal content of silica, wt. percent | Color | Color change | Rate of travel of color change, mm. per p.p.m. of oxygen per cubic foot |
|---|---|---|---|---|
| Titanium | 0.57 | Brown | To dark tan | 2.6 |
| Zirconium | 0.6 | Yellow | To tan | Not measured |
| Vanadium | 0.4 | Brown | To light brown | 2.5 |
| Vanadyl | 0.6 | ....do.... | ....do.... | 1.4 |
| Manganese | 0.48 | Dark gray | To light gray | 9.0 |
| Cobalt | 0.5 | Dark brown | To gray | 1.9 |
| Do | 0.14 | Gray | To light gray | 13.0 |

In all of the above instances, the detector was regenerable, undergoing a reverse color change upon reduction and, upon reuse, indicating comparative rates of color change and comparative rates of interface travel between color zones.

The following color changes were indicated when contacting various oxides of nitrogen and sulfur individually with a similarly prepared bed of silica containing the blue reaction product resulting from reacting bis(cyclopentadienyl)dichlorotitanium with trimethyl aluminum.

| Gas | Original color of silica | Color change |
|---|---|---|
| NO$_2$ | Blue | To orange |
| N$_2$O | ....do.... | Do. |
| SO$_2$ | ....do.... | To orange-brown |
| SO$_2$ in N$_2$ | ....do.... | To brown |

The above data indicate the preparation of suitable oxygen-detecting materials from the materials previously set forth and their use in detecting the presence of minute quantities of oxygen in gaseous streams.

Certain modifications will be evident from the above discussion. Such, however, are considered as being within the skill of the art.

What is claimed is:

1. A process for detecting the presence of free oxygen and oxygen compounds of sulfur and nitrogen in a gaseous stream which comprises contacting an organo-transition metal compound with said gaseous stream to produce a color change in said metal compound, said compound being the reaction product formed by reducing an organic compound of a metal of Group IV–B, V–B, VI–B, VII–B, or VIII of the Periodic Table with a hydride or an alkyl containing a metal of Group I–A, II or III–A of the Periodic Table, said organo-transition metal being contained in said compound in a lower valence state.

2. The process as defined in claim 1 in which said organo-transition metal compound is contacted with said gaseous stream in the reaction environment in which said metal compound is produced.

3. The process as defined in claim 1 in which said organo-transition metal compound is supported on a particulate support selected from the group consisting of silica, silica alumina and zirconia.

4. The process as defined in claim 1 in which the organo-transition metal compound is one of titanium, zirconium, tantalum, vanadium, chromium, manganese, iron, cobalt, and nickel in the form of an acetylacetonate or cyclopentadienyl derivative.

5. The process as defined in claim 1 in which the metal of Group I–A, II or III–A is in the form of a hydride.

6. The process as defined in claim 1 in which the metal of Group I–A, II or III–A is in the form of an alkyl.

7. The process as defined in claim 1 in which the gaseous stream is contacted with said reduced organo-transition metal compound at a linear velocity of said gas through said compound of from 0.1 to about 10 feet per second.

References Cited

UNITED STATES PATENTS 3,152,157   10/1964   Shapiro et al.      260—438.1 X
3,378,348   4/1968   McConnaughey      23—254

OTHER REFERENCES

F. A. Cotton, ed.: Progress in Inorganic Chemistry, 1966, Interscience Publ., vol. 7, QD151P7, pp. 391, 397, 400, 402.

MORRIS O. WOLK, Primary Examiner

R. M. REESE, Assistant Examiner

U.S. Cl. X.R.

23—253 TP; 260—429, 438.1, 438.5, 439